US009347385B2

(12) United States Patent
Kim et al.

(10) Patent No.: US 9,347,385 B2
(45) Date of Patent: May 24, 2016

(54) VARIABLE COMPRESSION RATIO DEVICE

(71) Applicant: Hyundai Motor Company, Seoul (KR)

(72) Inventors: Han Sang Kim, Ansan-si (KR); Wootae Kim, Anyang-si (KR); Pil Sung Jang, Seoul (KR); Bonghoon Han, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 96 days.

(21) Appl. No.: 14/472,033

(22) Filed: Aug. 28, 2014

(65) Prior Publication Data

US 2015/0167561 A1  Jun. 18, 2015

(30) Foreign Application Priority Data

Dec. 13, 2013 (KR) ........................ 10-2013-0155934

(51) Int. Cl.
| F02B 75/32 | (2006.01) |
| F02D 15/02 | (2006.01) |
| F02B 75/04 | (2006.01) |

(52) U.S. Cl.
CPC .............. *F02D 15/02* (2013.01); *F02B 75/044* (2013.01); *Y02T 10/12* (2013.01)

(58) Field of Classification Search
CPC ........ F02D 15/02; F02B 75/044; Y02T 10/12
USPC .............................................. 123/48 B, 78 B
See application file for complete search history.

(56) References Cited

U.S. PATENT DOCUMENTS

| 4,515,114 | A | * | 5/1985 | Dang | .......................... 123/48 B |
| 7,146,940 | B2 | * | 12/2006 | Knutsen | ...................... 123/48 B |
| 7,318,397 | B2 | * | 1/2008 | Ward | ........................... 123/48 R |
| 8,739,754 | B2 | * | 6/2014 | Yan | .............................. 123/193.6 |
| 2006/0102115 | A1 | * | 5/2006 | Hirano | ........................ 123/78 B |
| 2006/0249103 | A1 | * | 11/2006 | Valdivia | ...................... 123/41.35 |
| 2007/0175420 | A1 | * | 8/2007 | Ishikawa et al. | ......... 123/78 BA |

FOREIGN PATENT DOCUMENTS

| JP | 2009-036128 A | 2/2009 |
| JP | 5029290 B2 | 7/2012 |
| KR | 10-1180793 B1 | 9/2012 |

* cited by examiner

*Primary Examiner* — Marguerite McMahon
(74) *Attorney, Agent, or Firm* — Morgan, Lewis & Bockius LLP

(57) ABSTRACT

Disclosed is a variable compression ratio device which changes a top dead center of a piston provided in an engine depending on a driving state of the engine. The variable compression ratio device may include: a lower piston reciprocally movable in a cylinder of the engine and connected with a connecting rod to rotate a crankshaft, an operation chamber, an upper piston disposed above the lower piston and partially inserted into the operation chamber, a push plate dividing the operation chamber into upper and lower spaces, a hydraulic pressure chamber which is the lower space, an elastic member provided in the upper space to push the push plate downward, a hydraulic pressure supply unit selectively supplying hydraulic pressure to the hydraulic pressure chamber, and a hydraulic pressure supply pathway connecting the hydraulic pressure supply unit and the hydraulic pressure chamber for supplying the hydraulic pressure.

9 Claims, 4 Drawing Sheets

VARIABLE COMPRESSION RATIO DEVICE

CROSS-REFERENCE TO RELATED APPLICATION

The present application claims priority of Korean Patent Application Number 10-2013-0155934 filed on Dec. 13, 2013, the entire contents of which application are incorporated herein for all purposes by this reference.

BACKGROUND OF INVENTION

1. Field of Invention

The present invention relates to a variable compression ratio device, and more particularly, to a variable compression ratio device that changes a compression ratio by changing a volume of a combustion chamber.

2. Description of Related Art

In general, thermal efficiency of a heat engine increases as a compression ratio becomes higher. Here, the compression ratio is a ratio of a volume when gas flowing into a cylinder is compressed by a piston, and is represented by 'a cylinder volume/a combustion chamber volume at a top dead center of a piston'. That is, the compression ratio increases as the top dead center of the piston becomes higher.

In the case of a spark ignition engine, thermal efficiency may be increased by advancing ignition timing, but there may be a limit in advancing the ignition timing when considering abnormal combustion. Therefore, there is a need for a variable compression ratio (VCR) device for improving thermal efficiency of the heat engine.

The variable compression ratio device is a device that changes a compression ratio of a gaseous mixture depending on a driving state of the engine. The variable compression ratio device improves fuel efficiency by raising a compression ratio of a gaseous mixture at a low load driving state (low load condition) of the engine. At a high load driving state (high load condition) of the engine, the variable compression ratio device serves to prevent the occurrence of knocking and improve engine output by maximally supplying the gaseous mixture, and simultaneously lowering the compression ratio of the gaseous mixture.

In the variable compression ratio device, a manner of moving a cylinder block, a manner of changing a volume of the combustion chamber, a manner of changing the top dead center of the piston, and the like are applied.

However, numerous mechanical constituent elements are required in order to implement the variable compression ratio device in the related art, and thus the configuration of the variable compression ratio device may be complicated. In addition, in a case in which a motor or the like, which uses electricity as a power source, is used to drive the mechanical constituent elements, there is a problem in that fuel efficiency may deteriorate.

Furthermore, since power transmission of the motor requires relatively larger drive torque than other gear engagement, there is a limit in that a capacity of the motor becomes small. Therefore, an overall weight of the vehicle may be increased, and fuel efficiency may deteriorate.

Meanwhile, since connection relationships between the mechanical constituent elements are complicated, it is difficult to ensure quick responsiveness of the variable compression ratio device.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a variable compression ratio device which improves fuel efficiency. In addition, the present invention has been made in an effort to provide a variable compression ratio device which may have a simplified configuration, and may ensure responsiveness.

Various aspects of the present invention provide a variable compression ratio device which changes a top dead center of a piston provided in an engine depending on a driving state of the engine. The variable compression ratio device may include: a lower piston which is provided to be reciprocally movable in a cylinder of the engine, and connected with a connecting rod to rotate a crankshaft by reciprocal motion thereof; an operation chamber that is formed above a portion of the lower piston which is connected with the connecting rod; an upper piston which is disposed above the lower piston, and partially inserted into the operation chamber; a push plate which is formed on a part of the upper piston to divide the operation chamber into an upper space and a lower space; a hydraulic pressure chamber which is the lower space of the divided operation chamber; an elastic member which is provided in the upper space of the divided operation chamber to push the push plate downward; a hydraulic pressure supply unit which selectively supplies hydraulic pressure to the hydraulic pressure chamber; and a hydraulic pressure supply pathway which connects the hydraulic pressure supply unit and the hydraulic pressure chamber so that the hydraulic pressure is supplied from the hydraulic pressure supply unit to the hydraulic pressure chamber.

When the hydraulic pressure supplied to the hydraulic pressure chamber is equal to or more than a predetermined amount, the upper piston may be moved upward with respect to the lower piston. When the hydraulic pressure supplied to the hydraulic pressure chamber is less than the predetermined amount, the upper piston may be moved to an original position to come into contact with the lower piston as the push plate is pushed by the elastic member.

The hydraulic pressure supply pathway may include: a first hydraulic pressure line which is formed in a cylinder block, and has one end connected with the hydraulic pressure supply unit; a second hydraulic pressure line which is formed in the crankshaft, and has one end that communicates with the other end of the first hydraulic pressure line; a third hydraulic pressure line which is formed in the connecting rod, and has one end that communicates with the other end of the second hydraulic pressure line; and a fourth hydraulic pressure line which is formed in the lower piston, and has one end that communicates with the other end of the third hydraulic pressure line, and the other end that communicates with the hydraulic pressure chamber.

Fluid supplied from the hydraulic pressure supply unit may be supplied to the hydraulic pressure chamber sequentially through the first hydraulic pressure line, the second hydraulic pressure line, the third hydraulic pressure line, and the fourth hydraulic pressure line.

A connection portion between the first hydraulic pressure line and the second hydraulic pressure line, and a connection portion between the second hydraulic pressure line and the third hydraulic pressure line may be formed in a substantially circular groove shape to prevent loss of fluid due to rotation of the crankshaft.

Sealing members may be provided at the connection portions between the first hydraulic pressure line and the second hydraulic pressure line, and between the second hydraulic pressure line and the third hydraulic pressure line, and at a connection portion between the third hydraulic pressure line and the fourth hydraulic pressure line, respectively. The sealing members, which are provided at the connection portions between the first hydraulic pressure line and the second hydraulic pressure line, and between the second hydraulic pressure line and the third hydraulic pressure line, respectively, may be formed to have a shape that corresponds to the substantially circular groove shape of the connection portions.

Sealing members may be provided at a hydraulic pressure supply pathway connection portion between the lower piston and the connecting rod, a hydraulic pressure supply pathway connection portion between the connecting rod and the crankshaft, and a hydraulic pressure supply pathway connection portion between the crankshaft and the cylinder block.

The variable compression ratio device may further include a valve which is disposed between the hydraulic pressure supply unit and the hydraulic pressure supply pathway, and selectively opened or closed so that the hydraulic pressure is selectively supplied to the hydraulic pressure chamber. The valve may adjust an amount of fluid that is supplied to the hydraulic pressure chamber.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
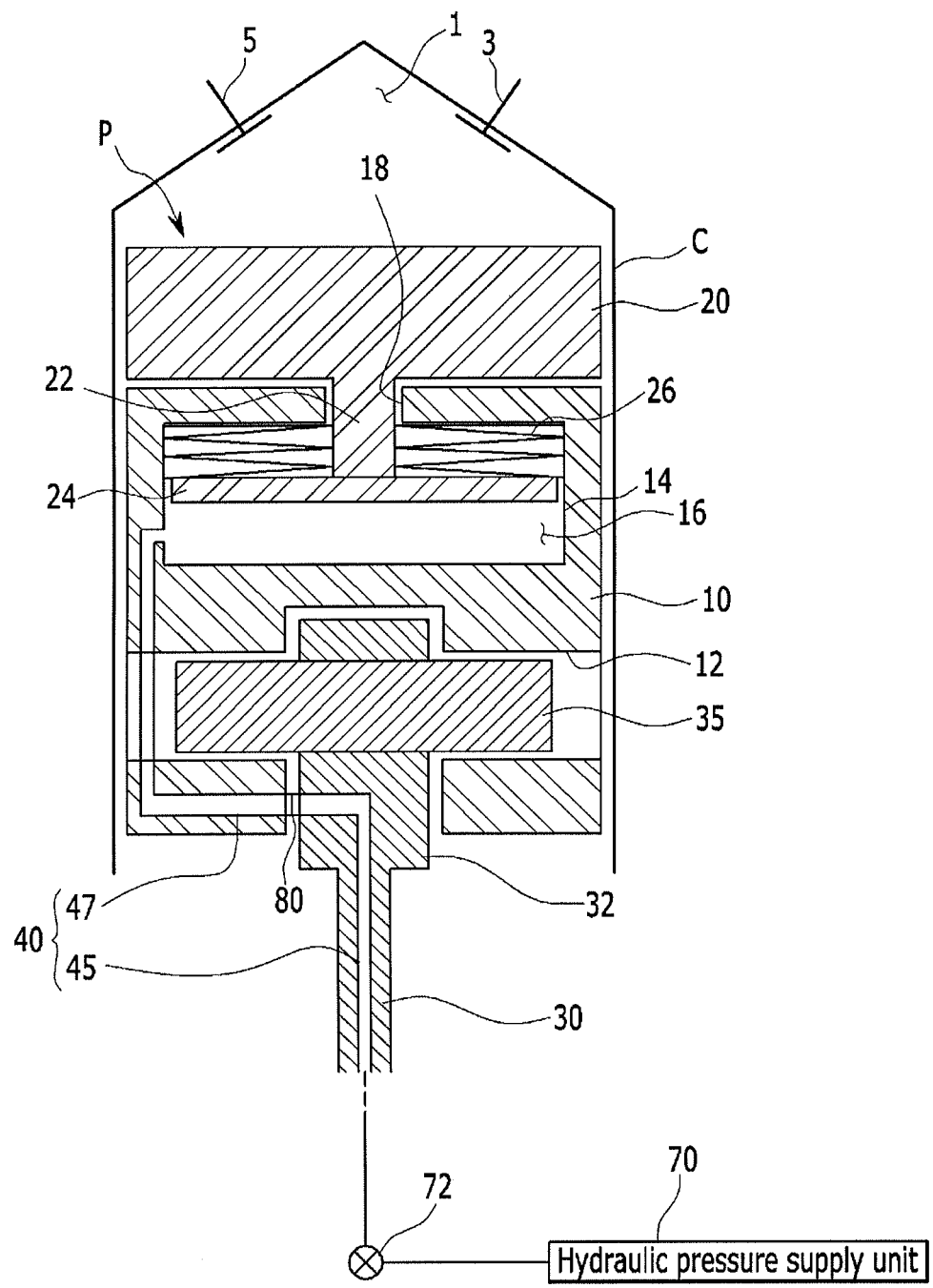
FIG. 1 is a configuration diagram of an exemplary variable compression ratio device according to the present invention.

FIG. 1 is a configuration diagram of a variable compression ratio device according to various embodiments of the present invention. As illustrated in FIG. 1, a variable compression ratio device according to various embodiments of the present invention includes a lower piston 10, an upper piston 20, an elastic member 26, a hydraulic pressure supply circuit or pathway 40, and a hydraulic pressure supply unit 70. In addition, the lower piston 10, the upper piston 20, and the elastic member 26 constitute a piston P that is provided to be reciprocally movable in a cylinder C of an engine.

Figure 3:
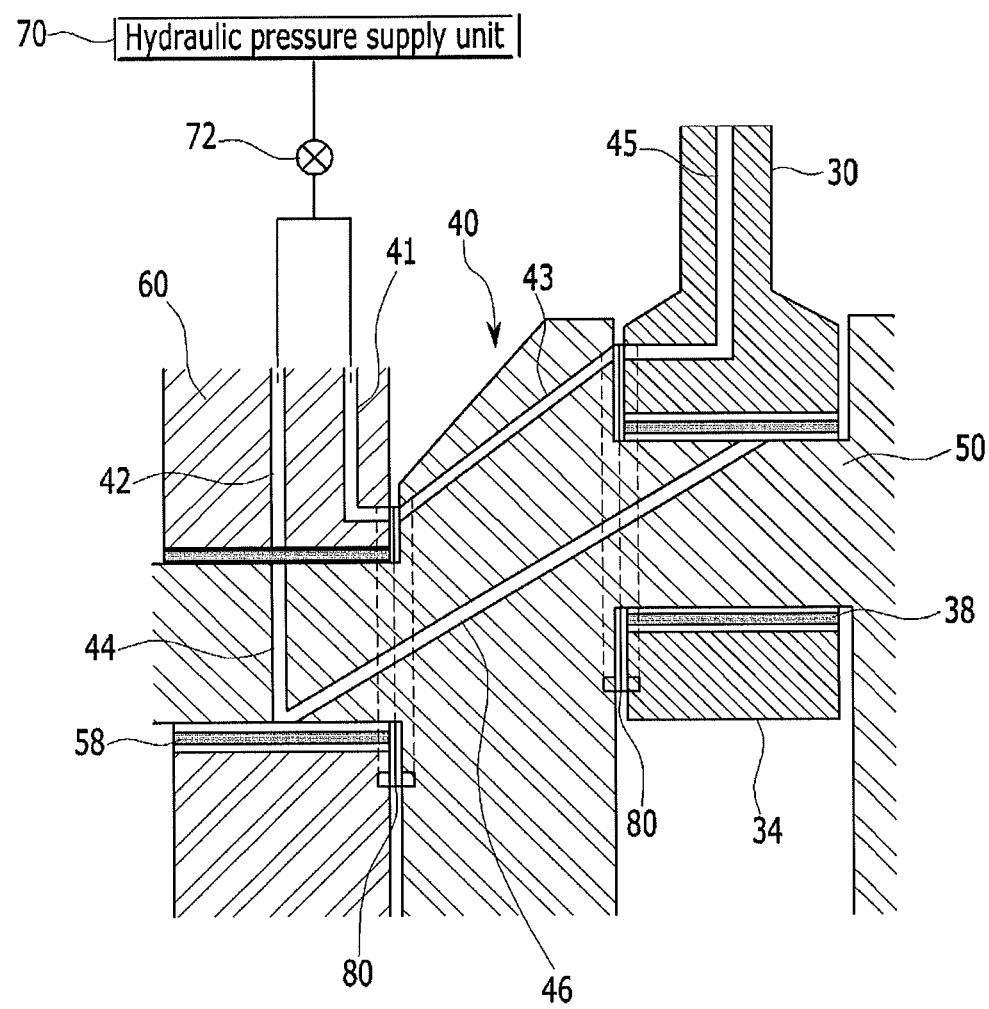
FIG. 3 is a view schematically illustrating a hydraulic pressure supply pathway in an exemplary variable compression ratio device according to the present invention.

The lower piston 10 is connected with a connecting rod 30 so as to rotate a crankshaft 50 by the reciprocal motion of the piston in the cylinder C (see FIG. 3). In addition, the lower piston 10 includes a pin hole 12, an operation chamber 14, a hydraulic pressure chamber 16, and a rod insertion hole 18.

The connecting rod 30 receives combustion force from the lower piston 10, and transmits the combustion force to the crankshaft 50 (see FIG. 3). In order to transmit the combustion force, one end of the connecting rod 30 is rotatably connected to the lower piston 10 by a piston pin 35, and the other end of the connecting rod 30 is rotatably connected to the crankshaft 50. Typically, the one end of the connecting rod 30 which is connected with the piston P is called a small end 32, and the other end of the connecting rod 30 which is connected with the crankshaft 50 is called a big end 34.

The pin hole 12 is a hole into which the piston pin 35 is inserted. That is, the piston pin 35 is disposed to pass through the small end 32 of the connecting rod 30 and the pin hole 12, such that the connecting rod 30 and the lower piston 10 are connected.

The connection between the connecting rod 30 and the piston P using the piston pin 35 may be the same as or similar to those in the art, and thus more detailed description thereof will be omitted.

The operation chamber 14 is a space that is formed in the lower piston 10 relatively above a portion where the connecting rod 30 and the lower piston 10 are connected. The hydraulic pressure chamber 16 is formed so that hydraulic pressure may be supplied to a part of the operation chamber 14. The rod insertion hole 18 is a hole that is pierced from an upper end of the lower piston 10 to the operation chamber 14.

A part of the upper piston 20 is inserted into the rod insertion hole 18 so as to be connected with the lower piston 10, and disposed relatively above the lower piston 10. In addition, the lower piston 10 and the upper piston 20 are inserted into the cylinder C with almost no clearance from an inner wall of the cylinder C. Meanwhile, in order to maintain air-tightness between the lower piston 10 and the upper piston 20 and the inner wall of the cylinder C, piston rings may be provided on the lower piston 10 and the upper piston 20 depending on a design of those skilled in the art. Furthermore, the upper piston 20 is provided to be selectively movable upward and downward on the basis of the lower piston 10. Here, as a volume of a combustion chamber 1 is changed by the upward and downward motion of the upper piston 20, a compression ratio of a gaseous mixture is changed.

The combustion chamber 1 is a space that is formed between the piston P and the cylinder C, and the gaseous mixture is sucked into the combustion chamber 1, or combusted gas is discharged from the combustion chamber 1, depending on opening and closing operations of an intake valve 3 and an exhaust valve 5. The combustion chamber 1, and the opening and closing operations of the intake and exhaust valves 3 and 5 may be the same as or similar to those in the art, and thus detailed description thereof will be omitted. In various embodiments of the present invention, the combustion chamber 1 is formed between the upper piston 20 and the cylinder C.

The upper piston 20 includes a connection rod 22, and a push plate 24. The connection rod 22 is a part of the upper piston 20 which is inserted into the rod insertion hole 18. That is, the connection rod 22 is formed on a lower portion of the upper piston 20, and one end of the connection rod 22 is inserted up to the operation chamber 14 through the rod insertion hole 18.

The push plate 24 is formed on the one end of the connection rod 22 which is inserted into the rod insertion hole 18. In addition, the push plate 24 is formed in a wide plate shape. Furthermore, the push plate 24 is provided with almost no clearance from an inner wall of the operation chamber 14, and the operation chamber 14 is divided into an upper space and a lower space by the push plate 24. Here, the hydraulic pressure chamber 16 is the lower space among the upper and lower spaces of the operation chamber 14 that is divided by the push plate 24.

The elastic member 26 is disposed in the upper space of the operation chamber 14. In addition, the elastic member 26 is provided to push the push plate 24 downward. Meanwhile, the elastic member 26 may be a coil spring, but the present invention is not limited thereto.

The hydraulic pressure supply circuit or pathway 40 is formed and disposed to supply hydraulic pressure to the hydraulic pressure chamber 16. A configuration in which the hydraulic pressure supply circuits 40 are formed in the connecting rod 30 and the lower piston 10, respectively, is illustrated in FIG. 1. Here, the hydraulic pressure supply circuit 40 formed in the connecting rod 30 communicates with the hydraulic pressure supply circuit 40 formed in the lower piston 10, and the hydraulic pressure supply circuit 40 formed in the lower piston 10 communicates with the hydraulic pressure chamber 16.

The hydraulic pressure supply unit 70 is a device that supplies hydraulic pressure to the hydraulic pressure supply circuit 40. In addition, hydraulic pressure supplied from the hydraulic pressure supply unit 70 is supplied to the hydraulic pressure chamber 16 sequentially through the hydraulic pressure supply circuit 40 formed in the connecting rod 30 and the hydraulic pressure supply circuit 40 formed in the lower piston 10. Meanwhile, the hydraulic pressure supply unit 70 may be a typical oil pump, but the present invention is not limited thereto, and fluid, which forms hydraulic pressure that is supplied to the hydraulic pressure chamber 16 through the hydraulic pressure supply circuit or pathway 40, may be oil or gas.

The hydraulic pressure supply unit 70 includes a supply valve 72. The supply valve 72 is opened or closed so that hydraulic pressure is selectively supplied, and interposed between the hydraulic pressure supply unit 70 and the hydraulic pressure supply circuit 40. In addition, the supply valve 72 adjusts a feed rate of the fluid F. However, the present invention is not limited thereto, and the supply valve 72 may not be needed in a case in which the hydraulic pressure supply unit 70 is operated to selectively supply hydraulic pressure.

Figure 2A:
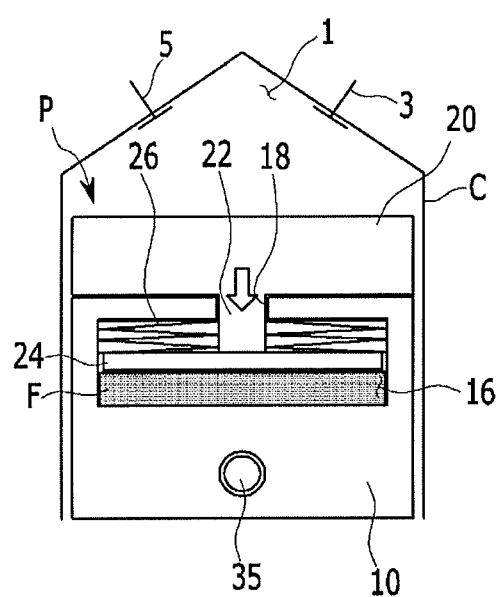
FIGS. 2A and 2B illustrate operation of an exemplary variable compression ratio device according to the present invention.
Figure 2B:
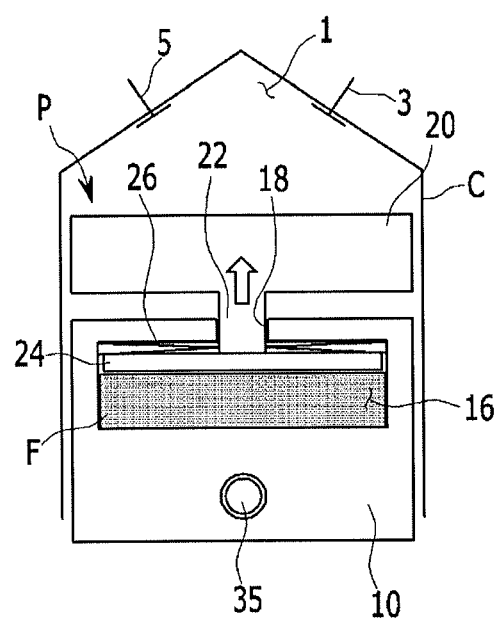

FIGS. 2A and 2B illustrate operation of an variable compression ratio device according to various embodiments of the present invention. As illustrated in FIG. 2, the upper piston 20 is moved upward and downward on the basis of the lower piston 10 depending on an amount of the fluid F that is injected into the hydraulic pressure chamber 16. Here, an amount of the fluid F represents the hydraulic pressure or the intensity of the hydraulic pressure.

FIG. 2A illustrates a state in which the upper piston 20 is moved downward when the supply of hydraulic pressure to the hydraulic pressure chamber 16 is shut off or a small amount of fluid F is supplied to the hydraulic pressure chamber 16, and FIG. 2B illustrates a state in which the upper piston 20 is moved upward when a predetermined amount or more of hydraulic pressure is supplied into the hydraulic pressure chamber 16.

As illustrated in FIG. 2A, in a case in which the supply of hydraulic pressure from the hydraulic pressure supply unit 70 to the hydraulic pressure chamber 16 is shut off or a small amount of fluid F is supplied to the hydraulic pressure chamber 16, the upper piston 20 is moved downward by force by which the elastic member 26 pushes the push plate 24. In addition, a lower surface of the upper piston 20 on which the connection rod 22 protrudes comes into contact with an upper surface of the lower piston 10. Therefore, the volume of the combustion chamber 1 is increased.

As illustrated in FIG. 2B, in a case in which a predetermined amount or more of hydraulic pressure is supplied from the hydraulic pressure supply unit 70 to the hydraulic pressure chamber 16, the upper piston 20 is moved upward by force by which the fluid F pushes the push plate 24. That is, the lower surface of the upper piston 20 on which the connection rod 22 protrudes is moved to be spaced apart from the upper surface of the lower piston 10. Therefore, the volume of the combustion chamber 1 is decreased. Here, a set value of the hydraulic pressure may be set by those skilled in the art by taking elastic force of the elastic member 26 into consideration.

FIG. 3 is a view schematically illustrating the hydraulic pressure supply circuit or pathway according to various embodiments of the present invention. As illustrated in FIG. 3, the hydraulic pressure supply circuit or pathway 40 includes first, second, third, and fourth hydraulic pressure lines 41, 43, 45, and 47, and first, second, and third lubrication lines 42, 44, and 46.

The first hydraulic pressure line 41 is formed in a cylinder block 60. In addition, one end of the first hydraulic pressure line 41 is connected with the hydraulic pressure supply unit 70.

The second hydraulic pressure line 43 is formed in the crankshaft 50. In addition, one end of the second hydraulic pressure line 43 communicates with the other end of the first hydraulic pressure line 41.

The third hydraulic pressure line 45 is the hydraulic pressure supply circuit 40 that is formed in the connecting rod 30 (see FIG. 1). In addition, one end of the third hydraulic pressure line 45 communicates with the other end of the second hydraulic pressure line 43. Furthermore, the one end of the third hydraulic pressure line 45 is formed in the big end 34 of the connecting rod 30, and the other end of the third hydraulic pressure line 45 is extended toward the small end 32 along the connecting rod 30.

The fourth hydraulic pressure line 47 is the hydraulic pressure supply circuit 40 that is formed in the lower piston 50 (see FIG. 1). In addition, one end of the fourth hydraulic pressure line 47 communicates with the other end of the third hydraulic pressure line 45 that is extended to the small end of the connecting rod 30 (see FIG. 1). As described above, the other end of the fourth hydraulic pressure line 47 communicates with the hydraulic pressure chamber 16.

The fluid F supplied from the hydraulic pressure supply unit 70 is supplied to the hydraulic pressure chamber 16 sequentially through the first hydraulic pressure line 41, the second hydraulic pressure line 43, the third hydraulic pressure line 45, and the fourth hydraulic pressure line 47.

The first, second, and third lubrication lines 42, 44, and 46 are provided to supply oil for lubricating a bearing 38 interposed in a connection portion between the connecting rod 30 and the crankshaft 50, and a bearing 58 interposed in a connection portion between the cylinder block 60 and the crankshaft 50. That is, the oil, which is supplied through the first, second, and third lubrication lines 42, 44, and 46, allows the crankshaft 50 to be smoothly rotated.

The first lubrication line 42 is formed in the cylinder block 60. In addition, one end of the first lubrication line 42 may be connected with the hydraulic pressure supply unit 7. A configuration in which the one end of the first lubrication line 42 is connected with the hydraulic pressure supply unit 70 is illustrated in FIG. 3, but the present invention is not limited thereto. In other words, in a case in which the fluid F, which is supplied to the hydraulic pressure supply unit 70 and forms hydraulic pressure, is not oil but gas, the first lubrication line 42 is not connected with the hydraulic pressure supply unit 70, but is connected with a device such as a hydraulic pump for supplying oil.

The second lubrication line 44 is formed in the crankshaft 50. In addition, the second lubrication line 44 is formed at a portion where the crankshaft 50 is connected with the cylinder block 60. Furthermore, the second lubrication line 44 is connected with the other end of the first lubrication line 42 which is extended to the connection portion between the crankshaft 50 and the cylinder block 60. Meanwhile, the second lubrication line 44 may be formed to penetrate the crankshaft 50 in a diameter direction of the bearing 58. Therefore, oil passing through the first lubrication line 42 and the second lubrication line 44 is used to lubricate the bearing 58 interposed in the connection portion between the cylinder block 60 and the crankshaft 50.

The third lubrication line 46 is formed in the crankshaft 50, and branches off from the second lubrication line 44. That is, one end of the third lubrication line 46 is connected with the second lubrication line 44. In addition, the other end of the third lubrication line 46 is extended to the connection portion between the crankshaft 50 and the connecting rod 30. Therefore, oil passing through the third lubrication line 46 is used to lubricate the bearing 38 interposed in the connection portion between the connecting rod 30 and the crankshaft 50.

Oil supplied to the first lubrication line 42 sequentially passes through the first lubrication line 42, the second lubrication line 44, and the third lubrication line 46, and in this process, oil, which has been used to lubricate the bearings 38 and 58, falls and is collected in the oil pan.

Meanwhile, in order to prevent loss of the fluid F, sealing members 80 are provided at a hydraulic pressure supply pathway 40 connection portion between the lower piston 10 and the connecting rod 30, a hydraulic pressure supply pathway 40 connection portion between the connecting rod 30 and the crankshaft 50, and a hydraulic pressure supply pathway 40 connection portion between the crankshaft 50 and the cylinder block 60. That is, the sealing members 80 are interposed between the first hydraulic pressure line 41 and the second hydraulic pressure line 43, between the second hydraulic pressure line 43 and the third hydraulic pressure line 45, and between the third hydraulic pressure line 45 and the fourth hydraulic pressure line 47. Here, in order to prevent loss of the fluid F due to rotation of the crankshaft 50, the connection portion between the first hydraulic pressure line 41 and the second hydraulic pressure line 43, and the connection portion between the second hydraulic pressure line 43 and the third hydraulic pressure line 45 are formed in a circular groove shape, respectively. In addition, the sealing members 80, which are disposed at the connection portion between the first hydraulic pressure line 41 and the second hydraulic pressure line 43, and the connection portion between the second hydraulic pressure line 43 and the third hydraulic pressure line 45, respectively, are formed in a circular shape so as to correspond to the shapes of the connection portion between the first hydraulic pressure line 41 and the second hydraulic pressure line 43, and the connection portion between the second hydraulic pressure line 43 and the third hydraulic pressure line 45.

The sealing members 80 protrude from a surface where the hydraulic pressure supply pathway 40 connection portion between the lower piston 10 and the connecting rod 30 is formed, so that the sealing member 80 provided on the lower piston 10 and the sealing member 80 provided on the connecting rod 30 come into contact with each other in an airtight manner. In this case, at least one of the sealing member 80 provided on the lower piston 10 and the sealing member 80 provided on the connecting rod 30 protrudes. In addition, the sealing member 80 protrudes from a surface where the hydraulic pressure supply pathway 40 connection portion between the connecting rod 30 and the crankshaft 50 is formed, so that the sealing member 80 provided on the connecting rod 30 and the sealing member 80 provided on the crankshaft 50 come into contact with each other in an airtight manner. In this case, at least one of the sealing member 80 provided on the connecting rod 30 and the sealing member 80 provided on the crankshaft 50 protrudes. Furthermore, the sealing member 80 protrudes from a surface where the hydraulic pressure supply pathway 40 connection portion between the crankshaft 50 and the cylinder block 60 is formed, so that the sealing member 80 provided on the crankshaft 50 and the sealing member 80 provided on the cylinder block 60 come into contact with each other in an airtight manner. In this case, at least one of the sealing member 80 provided on the crankshaft 50 and the sealing member 80 provided on the cylinder block 60 protrudes.

As described above, according to various embodiments of the present invention, a weight of a configuration for changing a top dead center of the piston P may be minimized, and the compression ratio may be efficiently changed, thereby improving fuel efficiency. In addition, since hydraulic pressure is used to perform an operation of changing the top dead center of the piston P, the configuration may be simplified, and responsiveness may be improved.

For convenience in explanation and accurate definition in the appended claims, the terms "upper" or "lower", "inner" or "outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio device which changes a top dead center of a piston provided in an engine depending on a driving state of the engine, the variable compression ratio device comprising:
    a lower piston which is provided to be reciprocally movable in a cylinder of the engine, and connected with a connecting rod to rotate a crankshaft by reciprocal motion thereof;
    an operation chamber that is formed above a portion of the lower piston which is connected with the connecting rod;
    an upper piston which is disposed above the lower piston, and partially inserted into the operation chamber;
    a push plate which is formed on a part of the upper piston to divide the operation chamber into an upper space and a lower space;

a hydraulic pressure chamber which is the lower space of the divided operation chamber;

an elastic member which is provided in the upper space of the divided operation chamber to push the push plate downward;

a hydraulic pressure supply unit which selectively supplies hydraulic pressure to the hydraulic pressure chamber; and a hydraulic pressure supply pathway which connects the hydraulic pressure supply unit and the hydraulic pressure chamber so that the hydraulic pressure is supplied from the hydraulic pressure supply unit to the hydraulic pressure chamber, wherein when the hydraulic pressure supplied to the hydraulic pressure chamber is equal to or more than a predetermined amount, the upper piston is moved upward with respect to the lower piston.

2. The variable compression ratio device of claim 1, wherein:

when the hydraulic pressure supplied to the hydraulic pressure chamber is less than the predetermined amount, the upper piston is moved to an original position to come into contact with the lower piston as the push plate is pushed by the elastic member.

3. The variable compression ratio device of claim 1, wherein the hydraulic pressure supply pathway includes:

a first hydraulic pressure line which is formed in a cylinder block, and has one end connected with the hydraulic pressure supply unit;

a second hydraulic pressure line which is formed in the crankshaft, and has one end that communicates with the other end of the first hydraulic pressure line;

a third hydraulic pressure line which is formed in the connecting rod, and has one end that communicates with the other end of the second hydraulic pressure line; and a fourth hydraulic pressure line which is formed in the lower piston, and has one end that communicates with the other end of the third hydraulic pressure line, and the other end that communicates with the hydraulic pressure chamber.

4. The variable compression ratio device of claim 3, wherein:

fluid supplied from the hydraulic pressure supply unit is supplied to the hydraulic pressure chamber sequentially through the first hydraulic pressure line, the second hydraulic pressure line, the third hydraulic pressure line, and the fourth hydraulic pressure line.

5. The variable compression ratio device of claim 3, wherein:

a connection portion between the first hydraulic pressure line and the second hydraulic pressure line, and a connection portion between the second hydraulic pressure line and the third hydraulic pressure line are formed in a substantially circular groove shape to prevent loss of fluid due to rotation of the crankshaft.

6. The variable compression ratio device of claim 5, wherein:

sealing members are provided at the connection portions between the first hydraulic pressure line and the second hydraulic pressure line, and between the second hydraulic pressure line and the third hydraulic pressure line, and at a connection portion between the third hydraulic pressure line and the fourth hydraulic pressure line, respectively, and the sealing members, which are provided at the connection portions between the first hydraulic pressure line and the second hydraulic pressure line, and between the second hydraulic pressure line and the third hydraulic pressure line, respectively, are formed to have a shape that corresponds to the substantially circular groove shape of the connection portions.

7. The variable compression ratio device of claim 3, wherein:

sealing members are provided at a hydraulic pressure supply pathway connection portion between the lower piston and the connecting rod, a hydraulic pressure supply pathway connection portion between the connecting rod and the crankshaft, and a hydraulic pressure supply pathway connection portion between the crankshaft and the cylinder block.

8. The variable compression ratio device of claim 1, further comprising:

a valve which is disposed between the hydraulic pressure supply unit and the hydraulic pressure supply pathway, and selectively opened or closed so that the hydraulic pressure is selectively supplied to the hydraulic pressure chamber.

9. The variable compression ratio device of claim 8, wherein:

the valve adjusts an amount of fluid that is supplied to the hydraulic pressure chamber.

* * * * *